US008939226B2

(12) United States Patent
Corsini et al.

(10) Patent No.: US 8,939,226 B2
(45) Date of Patent: Jan. 27, 2015

(54) V-SHAPED WEED CUTTING GARDEN TOOL AND EDGE TRIMMER

(76) Inventors: John Corsini, Hamilton (CA); Frank DiFelice, Hamilton (CA)

(*) Notice: Subject to any disclaimer, the term of this patent is extended or adjusted under 35 U.S.C. 154(b) by 0 days.

(21) Appl. No.: 13/531,727

(22) Filed: Jun. 25, 2012

(65) Prior Publication Data

US 2013/0000932 A1 Jan. 3, 2013

Related U.S. Application Data

(60) Provisional application No. 61/502,124, filed on Jun. 28, 2011.

(51) Int. Cl.
*A01B 1/08* (2006.01)
*A01B 1/16* (2006.01)

(52) U.S. Cl.
CPC ..... *A01B 1/08* (2013.01); *A01B 1/16* (2013.01)
USPC .......................... 172/375; 172/380

(58) Field of Classification Search
CPC .............. A01B 1/16; A01B 1/20; A01B 1/00; A01B 1/06; A01B 1/08
USPC ................. 172/371, 372, 375–378, 733, 756; 7/114
See application file for complete search history.

(56) References Cited

U.S. PATENT DOCUMENTS

| | | | | |
|---|---|---|---|---|
| 76,288 A * | 3/1868 | Pardee | ........................... | 172/372 |
| 80,277 A * | 7/1868 | Denio et al. | .................. | 172/375 |
| 203,798 A * | 5/1878 | Turner | ........................... | 172/375 |
| 318,148 A * | 5/1885 | Still | .............................. | 172/375 |
| D19,562 S * | 1/1890 | Douglas | ........................... | D8/11 |
| 501,662 A * | 7/1893 | Rechardson | .................. | 172/375 |
| 580,068 A * | 4/1897 | Timmins | ....................... | 172/375 |
| 801,978 A * | 10/1905 | Garner | .......................... | 172/375 |
| 1,023,701 A * | 4/1912 | Winn | ............................. | 172/375 |
| 1,037,870 A * | 9/1912 | Cone | ............................. | 172/375 |
| 1,144,314 A * | 6/1915 | Bastian | ......................... | 172/372 |
| 1,284,752 A * | 11/1918 | Neuman | ........................ | 172/375 |
| 1,564,373 A * | 12/1925 | Smith | ........................... | 254/132 |
| 1,739,489 A * | 12/1929 | Wagner | ......................... | 172/381 |
| 1,929,128 A * | 10/1933 | Vidmar | ......................... | 172/371 |
| 1,954,250 A * | 4/1934 | Lee | ................................ | 172/375 |
| 2,134,070 A * | 10/1938 | Avant | ............................ | 172/371 |
| 2,251,048 A | 7/1941 | Garland | | |
| 2,343,616 A * | 3/1944 | Kay | ............................... | 172/375 |
| 2,595,353 A * | 5/1952 | Graham | ........................ | 172/730 |
| 2,642,305 A * | 6/1953 | Butler | ............................. | 7/114 |
| 3,643,744 A | 2/1972 | Turnquist | | |
| 3,965,990 A * | 6/1976 | Pittman | ........................ | 172/375 |
| 5,467,830 A | 11/1995 | Watson | | |

(Continued)

*Primary Examiner* — Robert Pezzuto
*Assistant Examiner* — Jessica H Lutz
(74) *Attorney, Agent, or Firm* — Daniel Boudwin; Global Intellectual Property Agency LLC

(57) ABSTRACT

A weed-cutting gardening tool for easy cutting of plants and weeds as well as precision edge trimming. The device has an elongated handle secured to a working end with a V-shaped blade head. The blade head has an overall V-shape with a forward facing tip, two front blade edges, two rear blade edges, and two lateral blade edges. The blade edges provide a variety of cutting surfaces for a user to employ when trimming weeds. Different edges may be utilized by merely rotating the device, alleviating the need for a user to position his or her body in awkward positions. The device may also come with an elongated blade member that extends above the blade head and is useful for edge trimming along a sidewalk or garden boundary.

6 Claims, 2 Drawing Sheets

(56) References Cited

U.S. PATENT DOCUMENTS

| | | | |
|---|---|---|---|
| 5,609,325 A | 3/1997 | DeArmond | |
| 5,816,633 A * | 10/1998 | Odom | 294/51 |
| D418,380 S * | 1/2000 | Chrysler | D8/11 |
| 6,213,527 B1 | 4/2001 | Lampe | |
| 6,338,511 B1 * | 1/2002 | Douglas et al. | 294/49 |
| 6,415,874 B1 * | 7/2002 | Gritzmacher | 172/371 |
| D480,734 S * | 10/2003 | Poutre | D15/29 |
| 7,100,899 B2 | 9/2006 | Hoover | |
| 2010/0200255 A1 * | 8/2010 | Gee | 172/375 |

* cited by examiner

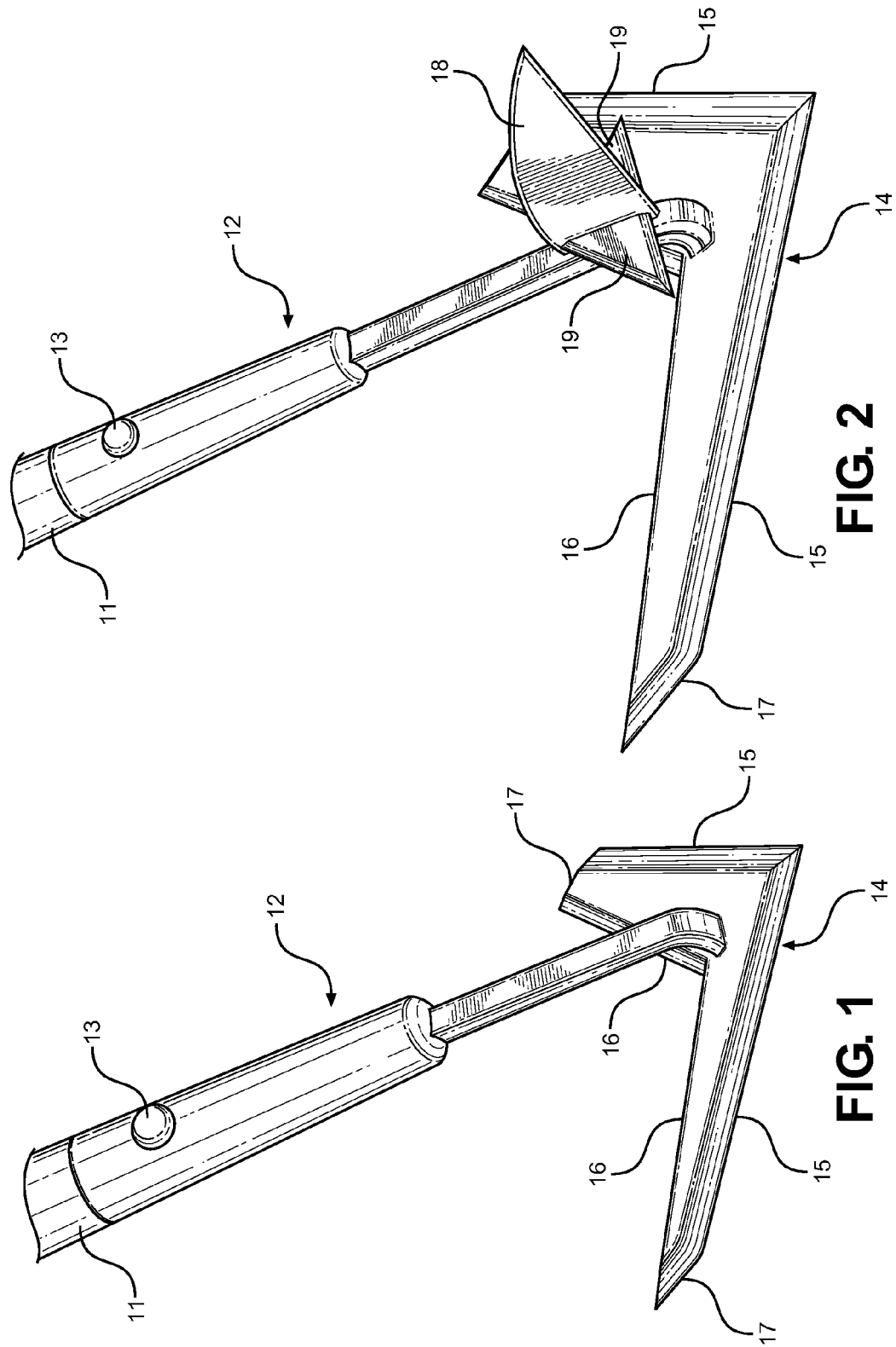

V-SHAPED WEED CUTTING GARDEN TOOL AND EDGE TRIMMER

CROSS REFERENCE TO RELATED APPLICATION

This application claims the benefit of U.S. Provisional Application No. 61/502,124 filed on Jun. 28, 2011 entitled "Frank's Garden Tool."

BACKGROUND OF THE INVENTION

1. Field of the Invention

The present invention relates to a garden tool for cutting weeds and shrubs. The long handle and V-shaped blade allow the user to stand while using the device to trim weeds and garden plants with precision. Practitioners with difficulty kneeling or those who prefer to stand will find the invention particularly useful.

Gardening tools have been employed for cultivation ever since the age of the ancient Fertile Crescent cultures. Such tools have changed dramatically since the time of the earliest shovels and hoes. Stone and iron tools were eventually replaced with modern metals that do not easily chip, crack, or rust. Handles are now comprised of wood or plastic to make the tools lighter and easier to use for long periods of time. Despite the long history of improvements to gardening tools, many problems still exist. Many tools still require a user to repeatedly lift the tool and bring it down sharply, or the reverse motion. Some tools require users to remain hunched over for lengthy periods of time, causing back pain and risking spinal injury. Tools may also be unwieldy or only have one useable surface, requiring users to contort their bodies or move into awkward positions to get proper leverage on the tool.

These problems are particularly pertinent to the activity of plant cutting and weed removal. Traditional methods of cutting and removal require a hoe like device to chop the weeds. The hoe is raised high and brought down rapidly to chop and the plants. Other weed removing gardening tools require the user to rip the plant out of the ground using the tool. These actions can put great strain on a user and may require awkward positioning of the body. To reduce the risk of injury, a weed-cutting gardening tool is needed that does not require users to make large repetitive motions or contort their body awkwardly.

2. Description of the Prior Art

The present V-shaped weed-cutting tool has a unique blade shape and bevel that is not disclosed by the prior art. This structure provides practitioners with the ability to use different edges of the device to trim in small or hard to reach areas of garden undergrowth. It can also be used for edge trimming along walkways and paths. The prior art devices do not disclose devices that offer the structure or function of the present invention.

Many of the weed cutting devices presently disclosed by the prior art are used for weed pulling rather than weed cutting and edge trimming. Patents such as Hoover, U.S. Pat. No. 7,100,899, Lampe, U.S. Pat. No. 6,213,527 disclose tools having a V-shaped cut-out along the rear portion of the working end of the tool. Alternative forms of the device are disclosed in DeArmond, U.S. Pat. No. 5,609,325 and Watson, U.S. Pat. No. 5,467,830, wherein the V-shaped cut-out is located at the front of the device. The use of these devices is relatively similar. A user positions the V-shaped cutout up against a weed and then pulls upward or at an angle, using the practitioner as leverage to pull the weed out. These devices do not offer a user the ability to cut plants off at a given level or to trim only a portion of the plant. The present invention's side facing blades facilitate both cutting of stalks as well as trimming small areas (edge trimming) of a plant. Prior art devices lack the outwardly bladed V-shaped structure that allows for precision trimming.

Some gardening tools do offer bladed edges, but these devices have drawbacks of their own. Garland, U.S. Pat. No. 2,251,048 describes a gardening tool having a pentagonal working end. The tip of the pentagon is disposed at the front of the device and two jagged bladed sides extend from the tip towards the rear of the device, forming two cutting, digging edges. Large, jagged edges assist the device in cutting or pushing down any plants in the path of the device. Another such device is disclosed by Turnquist, U.S. Pat. No. 3,643,744, which teaches a garden hoe having a jagged triangular head. The working end of the Turnquist hoe has a triangle shape with two jagged sides, but the head is permanently fixed in a position suitable for tilling and other common uses of a hoe. This fixed position renders the device inoperable for the purpose of edge trimming or precision cutting of plants and weeds. Neither the Garland nor the Turnquist device discloses smooth bladed sides suitable for precision cutting. The use of jagged blades to cut plant stalks will result in ripping and tearing of the plant material. This may be good for weed removal but would be counterproductive for use in precise and neat trimming of plants.

These prior art devices have several known drawbacks. None of the aforementioned devices are suitable for neat, precise cutting and trimming of plants. Though the devices may be useful for ripping up unwanted plants and tilling soil, they lack structure that would render them suitable for careful edgework in a garden. The present invention solves this problem by presenting a device that has a number of smooth beveled cutting edges, having several angles of orientation, to allow for manipulation of cutting surfaces in garden undergrowth. The present invention substantially diverges in design elements from the prior art and consequently it is clear that there is a need in the art for an improvement to existing weed-cutting gardening tool devices. In this regard the instant invention substantially fulfills these needs.

SUMMARY OF THE INVENTION

In view of the foregoing disadvantages inherent in the known types of weed-cutting gardening tools now present in the prior art, the present invention provides a new structure having multiple bladed surfaces wherein the same can be utilized for providing convenience for the user when cutting and trimming garden plants.

The device comprises an elongated handle secured to a working end having a V-shaped head. The V-shaped has two forward facing sides that join at a front tip. A V-shaped cutout is disposed at the rear of the head, giving the head an overall V-shape. Smaller sides may be included along the sides of the forward and rear edges to create multiple cutting surfaces, but the overall shape of the head remains the same. Users can use different cutting edges to trim plants within a dense area. Some plants may be difficult to reach with a given blade edge, requiring users to rotate the device or use other edges. Because the device provides so many cutting edges, users to not have to move into awkward positions to manipulate a cutting edge into position for use.

An alternative embodiment of the device includes n extension blade attachment secured to the working end above the V-shaped head. The extension blade attachment will be useful in cutting up weeds that grow up in the cracks of walkways. It can also be used for edging around walkways. Other anticipated uses include digging out the roots of unwanted plants after the stalks are cut by the bladed edges of the head.

It is therefore an object of the present invention to provide a new and improved weed-cutting gardening tool device that has all of the advantages of the prior art and none of the disadvantages.

It is another object of the present invention to provide a device having multiple bladed edges to allow users to cut plants and shrubs without awkward manipulation of the user's body.

Another object of the present invention is to provide a device that can be used to trim the edges of walkways and paths.

Yet another object of the present invention is to provide a device that can neatly trim plants without ripping or tearing at the plant stalk, so as to avoid long term damage to the plant.

A still further object of the present invention is to provide an alternative embodiment of the device having an extension blade attachment. The attachment may be used for edging along walkways, tilling dirt or digging out the roots of unwanted weeds.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 discloses a perspective view of the invention with the elongated handle removably secured to the V-shaped head.

FIG. 2 shows a perspective view of the invention with the elongated handle removably secured to the extension handle. The elongated blade attachment is secured to the working end.

DETAILED DESCRIPTION OF THE INVENTION

Figure 3:
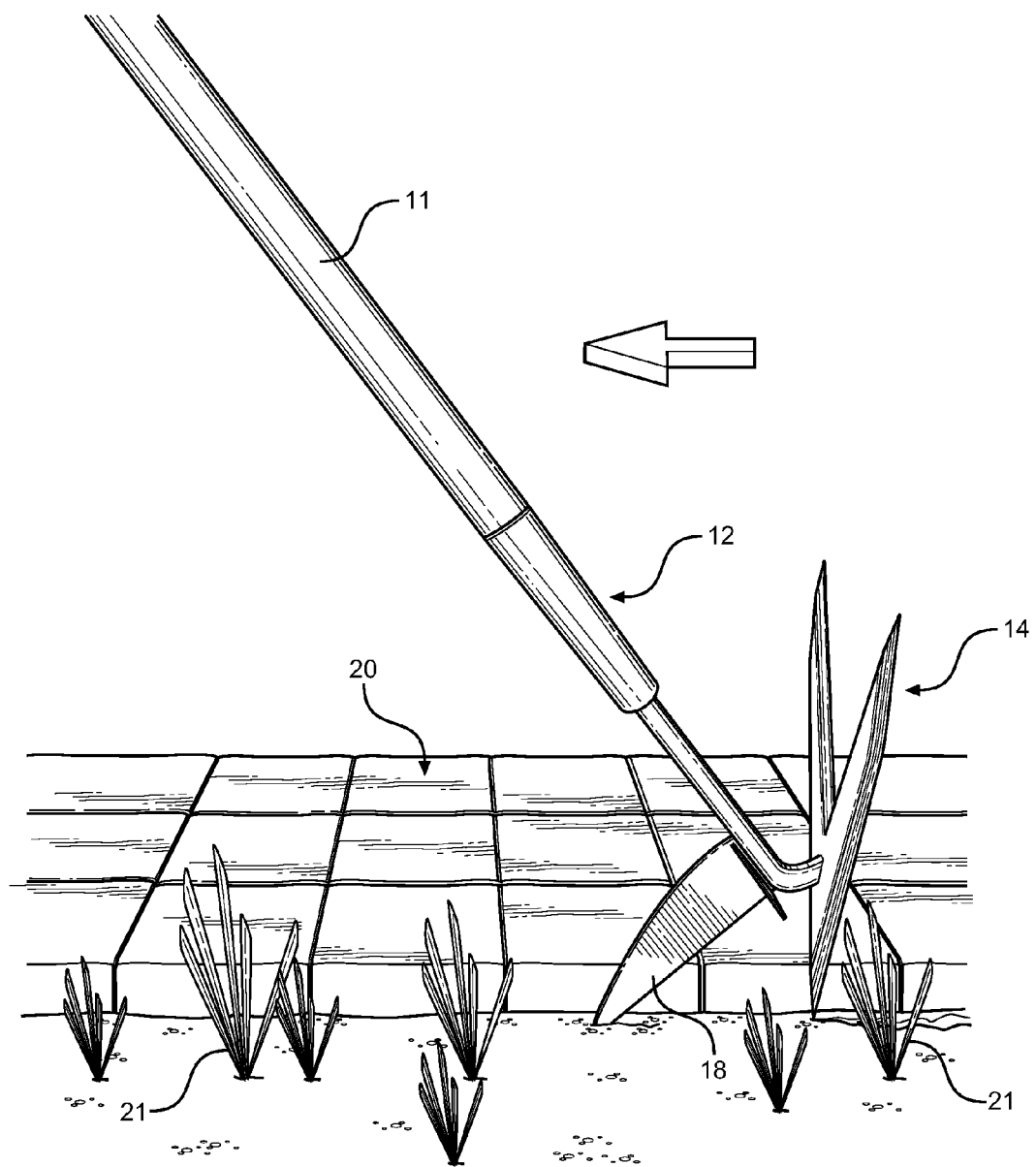
FIG. 3 shows a side view of the alternative embodiment of the device in use. The elongated blade attachment is dragged along the edge of a pathway to cut down any weeds cluttering pathway edges.

Reference is made herein to the attached drawings. Like reference numerals are used throughout the drawings to depict like or similar elements of the weed-cutting gardening tool. For the purposes of presenting a brief and clear description of the present invention, the preferred embodiment will be discussed as used for neatly cutting plants and weeds and trimming edges of walkways and garden areas. The figures are intended for representative purposes only and should not be considered to be limiting in any respect.

Referring now to FIG. 1, there is shown a perspective view of the gardening tool. An elongated handle 11 is secured to a working end 12 by a fastening means 13. The working end comprises a sheath portion and a blade support portion. The sheath portion has a perimeter slightly larger than the elongated handle so that a lower end of the handle fits within the sheath portion. The blade support portion connects the sheath portion of the working end to the blade head 14. One or more apertures in the sheath portion allow for a fastening means to be inserted into the elongated handle, securing it in place. The fastening means may be a nail, screw or other such fasteners. Alternatively, the fastening means may be a depressible button, that when depressed allows for insertion or removal of the elongated handle from the working end. The button is secured to the elongated handle and must be depressed before the handle can slide into the sheath portion. The button then pops up when aligned with an aperture, creating a lockable engagement between the handle and the sheath portion. Reversal of the process is employed to remove the handle from the sheath portion. This alternative embodiment permits the device to be used as a hand-held gardening tool, wherein a user grips the device by the sheath portion, or as a full-size gardening tool with elongated handle inserted.

The blade head 14 has an overall V shape, with the bottom of the v located at the front of the device. A pointed tip is located at the front of the head and two front bladed edges 15 extend backward from the tip. A pair of rear bladed edges 16 are aligned behind the front bladed edges, creating a V shaped cutout at the back of the head. In a preferred embodiment, there may be two lateral blade edges 17 extending between the front and rear blade edges. Alternatively, the front and rear blade edges may come together at a point on either side of the head. Thus there may be 6 or 4 cutting surfaces, providing a user with several angles at which to cut plants and weeds.

An alternate embodiment of the device is shown in FIG. 2, having an elongated blade member 18 and two upper blade members 19. This embodiment is the same as the preferred embodiment in that it has an elongated handle 11 secured to the working end 12 by a fastening means 13, and that the working end's blade support portion connects the sheath to the blade head 14. The blade head also is the same, with two front blade edges 15, two lateral blade edges 17, and two rear blade edges 16. But, this embodiment includes an elongated blade that extends outwardly from the blade support portion. It may extend perpendicularly from the blade support or at another angle depending on the intended use of the tool. This elongated blade is ideal for cutting weeds that have grown up between cracks in a walkway because it can get to hard to reach areas. It may also be used for trimming along the sides of a walkway. The elongated blade member may have curved or straight blade edges to facilitate cutting of different types of plants. Also secured to the blade support portion, and extending outward therefrom at an angle perpendicular to the extension blade are two upper blade members. These edges are useful for trimming upper areas of plants and can be employed while either the blade head or the elongated blade member is in use.

Turning now to FIG. 3 there is shown a side view of the elongated blade member in use. The elongated handle 11 is secured to the working end 12 and the device has been rotated so that the blade head 14 points downward. In this orientation, the elongated blade member 18 points downward. The elongated blade member is placed next to the edge of a walkway 20 and the device is then pulled towards the user. The blade will trim any plants 21 that are overgrown along the side of the walkway.

In use an individual grips the device by the elongated handle, or the sheath portion if the handle is removed. The user then places the lower surface of the blade head on the ground and slides it into position next to weeds to be cut. A selected blade edge is slid against the weed stalk until the stalk is severed. The blade head is rotated by the user in order to reach dense undergrowth in the garden. Once general trimming is done, the user can trim along the sides of buildings, walkways or other structures by rotating the device so that a blade edge is aligned with the side of the structure, then dragging the blade edge along the side of the structure. The elongated blade member may also be used for this purpose, as shown in FIG. 3.

The present invention is a weed-cutting gardening tool providing a number of sharp cutting edges disposed at different orientations. The purpose of this structure is to facilitate the easy cutting and removal of unwanted plants such as weeds. The blade edges may be beveled, as show in the figures, or may have a generally tapered cutting edge. Blade edges may be straight or curved depending on the intended use of the tool. Some gardens may be better suited to curved blade edges and thus an embodiment with curved blade edges is contemplated. Regardless of edge type, the overall shape of the blade head should be a V-shape in order to provide a low-profile design that offers the variety of cutting surfaces that gardeners require. An elongated blade member and upper blade members may be further included to provide even more flexibility in use of the tool while cutting weeds. The blade head and working end may be constructed of any durable, shock resistant material such as metal. The elongated handle may be made of wood, plastic, metal or any other durable material.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A weed-cutting gardening tool, comprising:
an elongated handle having a working end;
said working end having a sheath portion and a blade support member, wherein said elongated handle is secured to said sheath portion by a fastener;
a V-shaped blade head with a plurality of blade edges secured to said blade support member;
an elongated blade member having a curved front blade edge and a straight rear blade edge, and a straight bottom edge;
a first upper blade member and a second upper blade member;
wherein said bottom edge of said elongated blade member is secured to said blade support member above said blade head and wherein said rear blade edge extends orthogonally from said blade support member;
wherein each of said first upper blade member and said second upper blade member is configured substantially as a right triangle with a hypotenuse which is oriented towards and away from said front blade edge of said elongated blade member; and
each of said first upper blade member and said second upper blade member secured to said blade support member and extending therefrom on opposing sides of said elongated blade member, forming a straight line.

2. The device of claim 1, wherein said blade head comprises a pointed tip and a pair of front blade edges extending backward therefrom.

3. The device of claim 1, wherein said blade head comprises a pair of rear blade edges forming a V-shaped cutout at a back portion of said blade head.

4. The device of claim 1, wherein said blade head comprises a pair of lateral blade edges disposed along opposing sides of said blade head.

5. The device of claim 1, wherein said fastener is a depressible button that removably engages with said sheath portion to affect removable securement of said elongated handle to said sheath portion.

6. The device of claim 1, wherein said front blade edge of said elongated blade member faces towards said elongated handle; and
said rear blade edge of said elongated blade member faces towards said blade head.

* * * * *